United States Patent [19]

Minnick

[11] 3,753,620

[45] Aug. 21, 1973

[54] IN-SITU TREATMENT OF ROADWAY

[75] Inventor: Leonard John Minnick, Cheltenham, Pa.

[73] Assignee: IU Conversion Systems, Inc., Philadelphia, Pa.

[22] Filed: June 7, 1971

[21] Appl. No.: 150,777

[62] Division of Ser. No. 780,902, Dec. 3, 1968, Pat. No. 3,634,115.

[52] U.S. Cl. ................................................. 404/76
[51] Int. Cl. ............................................. E01c 7/36
[58] Field of Search .................... 94/22, 25; 106/85, 106/120; 404/76

[56] References Cited
UNITED STATES PATENTS

| | | | |
|---|---|---|---|
| 2,937,581 | 5/1960 | Havelin | 94/22 |
| 2,564,690 | 8/1951 | Havelin | 106/120 |
| 2,698,252 | 12/1954 | Havelin | 106/120 |
| 2,815,294 | 12/1957 | Havelin | 106/118 |
| 2,987,408 | 6/1961 | Minnick | 106/85 X |

*Primary Examiner*—Nile C. Byers, Jr.
*Attorney*—Henry N. Paul, Jr., Paul F. Prestia et al.

[57] ABSTRACT

A new bituminous coal fly ash is sulfopozzolanically reactive and contains combined sulfate in stated proportions relative to alkaline earth metal oxide content. Load-supporting compositions of this fly ash combined with aggregate, and a method of applying the new fly ash to an existing surface.

2 Claims, No Drawings

IN-SITU TREATMENT OF ROADWAY

This is a division of application Ser. No. 780,902, filed Dec. 3, 1968, now U.S. Pat. No. 3,634,115.

BRIEF SUMMARY OF THE INVENTION

This invention relates to the preparation of highly active fly ash, to a composition into which it is introduced, and to a method of its use. It relates more specifically to sulfopozzolanically reactive fly ash having a high sulfate content, which is very useful for preparation of stabilized load-supporting compositions having superior qualities.

BACKGROUND OF THE INVENTION

The U.S. Pats. to Havelin and Khan Nos. 2,564,690, 2,698,252, 2,815,294 and 2,937,581 disclose compositions and methods for forming stabilized load-supporting bases such as roads, highways, airport runways and the like. Those patents disclose various combinations of lime and fly ash with other ingredients such as soil, sand, clay and the like. Other patents of the group disclose the addition of ingredients such as specially graded aggregate and the like.

The U.S. Pat. to Minnick et al. No. 3,206,319 discloses an improved form of fly ash, and indicates the nature of various efforts that have been made in the industry relating to the stabilization of load-supporting bases.

One of the important factors in providing a stabilized load-supporting base is to provide a composition which sets up sufficiently rapidly that it possesses a relatively high early compressive strength. Ordinary fly ash, collected from the usual preciptators in the stacks of coal burning furnaces, produces a stabilized soil composition which sets up rather slowly and requires many weeks of time in order to build up a high compressive strength.

The primary difficulty with these materials, as noted in the aforementioned patents, is concerned with the rather slow rate of hardening which is characteristic of these compositions. Directly associated with this situation are problems related to durability under alternate cycles of wetting and drying or freezing and thawing. Delays are sometimes experienced in construction while adequate structural characteristics are developed in the compositions.

It is an object of this invention to provide a specially prepared fly ash which has excellent properties when used in compositions of the type referred to. Further, the invention relates to load-supporting compositions having relatively high early compressive strength, and which contain such novel fly ash. Still another object is to provide a method of making such highly active fly ash.

Recent investigations have indicated that dolomite and high calcium limestones offer some possibility in the treatment of gases containing sulfur oxides as produced in the combustion of coal and oil. The effort to date has been primarily concerned with the injection of the raw limestone (calcite or dolomite, for example) into the fuel or into the furnace so that the high temperature of burning calcines the limestone to form an oxide or mixture of oxides which in turn reacts with the sulfur trioxide and sulfur dioxide in the gas. Unfortunately, the attempts to accomplish this have been unsuccessful unsuccessul in that substantially higher amounts of limestone are required than the stoichiometric requirement to react with the sulfur oxides. This, therefore, requires high doses of the additive which presents both physical difficulties in the injection process (contaminates the boiler) and economic disadvantages. Furthermore, the fly ash product of these attempts has always contained very little of the sulfur in the form of sulfate. Some attempts have been made to treat the resulting ash while suspended in the gas stream in scrubbers, the purpose of this being to hydrate the lime and thereby capture any residual sulfur dioxide. Such a process results in the formation of substantial quantities of calcium and/or magnesium sulfite which are well known to be toxic and are also objectionable from the standpoint of their utilization in compositions such as mortar, concrete and the like.

SUMMARY OF THE INVENTION

It has now been discovered that excellent load-supporting compositions may be prepared from a novel highly active, sulfopozzolanically reactive fly ash, which is useful per se, or as a component in compositions in the ranges which follow:

| Percent by weight | |
|---|---|
| Highly active fly ash | 8 to 95 |
| Aggregate | 5 to 92 |
| Water | 5 to 30 |

The highly active fly ash according to this invention has a combined sulfur content of about 5 to 50 percent expressed as sulfur trioxide, and a content of calcium oxide plus magnesium oxide (actually present as these compounds) from about 0.5 to about 30 percent by weight, wherein the ratio of uncombined calcium oxide plus magnesium oxide to combined calcium oxide plus magnesium oxide varies from about 0.2:1 to about 3:1. The sulfur content includes substantial concentrations of sulfate ions in combination with calcium oxide and magnesium oxide, as well as other constituents of the ash. Specifically the preferred compounds that are present include calcium sulfo-aluminates of several types, calcium and magnesium sulfates, as well as certain complex silicates. It is significant that the calcium oxide and magnesium oxide content is in a mineralogical form that provides special characteristics which obviate the undesirable effect that such oxides produce in a fly ash and further enhance the properties of the ash so that when used in certain compositions the ash shows greatly superior performance to that obtained from other sources heretofore available.

Fly ash made from bituminous coal is normally low in calcium and/or magnesium oxide content. Such fly ash is well known to be a pozzolan whereby the finely divided amorphous siliceous glass will react with calcium and magnesium oxide (or hydroxides) to develop cementitious compounds. On the other hand, fly ash produced from the combustion of lignite coal is well known to contain substantial quantities of calcium oxide and magnesium oxide. However, the utilization of such an ash in compositions such as portland cement mortar and concrete can produce deleterious expansive reactions due, it is believed, to the hydration products produced when the oxide is cured over extended periods of time in the presence of moisture. An example of this type of reaction is demonstrated in the inability of such lignite ashes to remain dimensionally stable when tested in a high pressure autoclave. When the CaO content exceeds a maximum (threshold) amount the deleterious expansion occurs.

In the case of the fly ash of this invention, concentrations of calcium and magnesium compounds are so high that serious expansion would be expected. However, due to the formation of the complex sulfates and also due to the high concentration of sulfate ions, these deleterious reactions do not occur. Furthermore, tests have shown that the complex sulfates cause a dramatic change in the hydraulicity of the fly ash when used in compositions such as mortar, concrete, and road base formulations.

The preferred method of making products according to this invention involves the injection of lime into the boiler at a particular temperature range under conditions that provide for reaction of the major part of the lime with the sulfur oxide gases in the presence of semi-molten fly ash, thereby producing the product of the invention. The lime may be quicklime or preferably hydrated lime. One excellent form of lime is a dolomitic hydrate of the formula:

$$Ca(OH)_2 \cdot MgO \cdot xH_2O$$

where $x$ may be any value from 1 to 0.

In any event, the lime or limestone used in accordance with this invention can either be high calcium lime or limestone, or so-called dolomitic lime or limestone containing a mixture of calcium and magnesium oxides or carbonates. For purposes of this invention, magnesium oxide and calcium oxide are considered to be substantially completely interchangeable.

The lime or limestone can either be introduced separately into the combustion chamber of the boiler or can be interground with the coal to form a composite starting material which is then conducted into the furnace in the conventional manner. The former is preferred.

While limestone, the carbonate, is often useful in accordnace with a process according to this invention, it is preferred to pre-make the lime in a conventional lime kiln or otherwise, eliminating all or a substantial part of the carbonate content of the limestone, and then to introduce the lime either as calcium oxide or magnesium oxide or a mixture of the two into the coal furnace at the operating temperature of the combustion part of the furnace. This gives an extremely quick reaction between the sulfur content of the coal and the alkali metal content of the lime, and produces a reaction product which is extremely easy to handle and makes exceptionally good load-supporting material.

It is highly preferred according to this invention that the hydrated lime be made up of particles not exceeding about 5 microns in size and preferably of a size not to exceed about 1 micron. The surface area of the material is preferably of the order of about 30,000 sq. cm/gm or greater. The preferred type of hydrate for the process is a special material produced from quicklime formed in the lime kiln described in U. S. Pat. No. 3,250,520. Such a quicklime has abnormally high reactivity and when converted to a hydrate demonstrates superior features when utilized in the process of this invention. Furthermore, the production of a dihydrated dolomitic lime (such as described in the U. S. Pat. No. 2,309,168) has been found to be the most effective in carrying out the reaction in the boiler.

The reaction in the boiler is temperature-limited and the injection of the lime material must be made at a point in the boiler where the temperature is in the range of about 1,500° to 2,000° F. Temperatures substantially below about 1,500° F will not ordinarily result in a suitable reaction, particularly insofar as the magnesium oxide content is concerned. Where high calcium material is used, or where the magnesium content is low, the temperature may be dropped several hundred degrees with a reasonably satisfactory performance.

One other factor of importance is that the reactant material must be dispersed throughout the gases of combustion in the boiler in a manner to provide intimate contact between the particles and the gas stream. This may be done by the use of a mechanical injection device such as a high speed screw, for example. One of the advantages of using the (lime) dihydrate is that it produces a thorough dispersion under this condition. The injection may also be accomplished by the use of air, combustion gases, or steam provided that the injection gas is not used in an excessive amount which would cause instability within the boiler.

In accordance with the preferred process of manufacturing the highly active fly ash in accordance with this invention, coal is burned in any existing coal furnace, in the presence of sulfur which is either initially present in the coal or has been added to the coal in the event that the original sulfur content of the coal is too low. This produces flue gases and fly ash in the furnace stack, such flue gases containing sulfur in gaseous form. In accordance with this invention, lime which has been previously prepared in a conventional lime kiln is injected into a boiler in an area of high temperatures such as 1,500°– 2,000° F. for example. The sulfur reacts quickly with the lime and with the oxygen in the air to produce a dry fly ash product which has a high sulfate content, as previously discussed. This reaction product is a highly reactive fly ash and makes extremely good load-supporting compositions of the type referred to hereinafter. Further, the reaction product is dry and easy to handle, and to package and ship.

It is known that lime and fly ash produce agglomerates when they react, and that these agglomerates do not all enter into the strength-developing sulfopozzolanic reaction. Conventional methods of dispersing these ingredients do not work well, but it has been found that an intimate mixture which is surprisingly free of agglomerates can be obtained by feeding lime or limestone into the high temperature portion of a conventional boiler, which not only reacts with the sulfur content in the fly ash in the boiler, but also causes reactions with glassy phases of the fly ash, and furthermore acts in such a way that it is substantially uniformly distributed in the fine particulate state, without the formation of disadvantageous agglomerates.

It is believed that the principal reactants of the lime and limestone of the strength-developing sulfopozzolanic reaction are calcium hydroxide, $Ca(OH)_2$, calcium oxide, CaO, and magnesium oxide, MgO.

It is to be appreciated that, while most forms of coal are so low in calcium and magnesium content, such as calcium and magnesium carbonate, that no reaction of any substantial extent in accordance with this invention is achieved by using the original content of the coal alone. However, certain specific types of coal such as lignites have limestones in them as they occur in nature, but lignites have low sulfur content and it may be desirable to augment their sulfur content in order to achieve the highly desirable results that are attained in accordance with this invention.

It is not known why the fly ash according to this invention gives such excellent results in combination with lime and aggregate. However, it is known that the sulfur enters into chemical (and perhaps other) reactions at the high temperatures that exist in the furnace, believed to form complexes of a nature not yet fully ascertained. It should suffice to say that the sulfur is not merely present as a mechanical mixture of calcium sulfate and magnesium sulfate with the other ingredients of the fly ash. It is considered likely that an anhydrite of the calcium sulfo-aluminate substance known as "ettringite" $3CaO \cdot Al_2O_3 \cdot 3CaSO_4 \cdot 30-32\ H_2O$ is formed at least in part, and that this may be partially responsible for the excellent hydraulic set that is obtained when the high sulfate fly ash according to this inention is combined with water and an aggregate.

It is believed that the excellence of the fly ash in accordance with this invention is based at least in part on the fact that it is reactive with water to produce from about 4 to 50 percent by weight based on the original weight of the fly ash of alkali metal sulfo-aluminate hydrates which appear in two forms, one of which is referred to as the high sulfate form and the other as the low sulfate form. The high sulfate form corresponds approximately to the formula $3MO \cdot Al_2O_3 \cdot 3MSO_4 \cdot 30-32\ H_2O$, where M represents calcium or magnesium, and the calcium form is known as "ettringite." The low sulfate form corresponds approximately to the formula $3MO \cdot Al_2O_3 \cdot MSO_4 \cdot 12-13\ 12-H_2O$. One or both forms of alkali metal sulfo-aluminate hydrate can be detected in final compositions that are produced according to this invention by electron microscopy procedures.

In accordance with this invention, particularly the reaction stage involving the reaction between the lime or limestone on the one hand and the fly ash on the other, the preferred reaction temperature is about 1,800° to about 1,900° F. at a reaction time which totals approximately 1 – 3 seconds, ideally about 2 seconds. This differs drastically from the reaction temperatures and times that are obtained in portland cement furnaces, where the reaction products are formed at about 2,800° F, and the reaction is permitted to continue for about 20 – 30 minutes.

It has been found that the presence of the high sulfate form of alkali metal sulfo-aluminate hydrate produces a structural product that is self-sealing to a considerable extent. The formation of alkali metal sulfo-aluminate hydrate with 32 molecules of water is an expansive reaction, but the compound seals itself so that it has greatly reduced capillarity and therefore has better resistance to the effects of moisture. Also, the resulting load-supporting composition, when exposed to the elements, has better resistance to alternate cycles of wetting and drying, which is a factor of great importance in the performance of such load-supporting materials.

It is, of course, a salient advantage of this invention that, because of the relatively high speed reactions that are achieved when using special fly ash in accordance with this invention, load-supporting surfaces containing the fly ash together with lime and soil can be mixed together in wet weather and compacted in place, particularly during relatively cool wet seasons such as the late fall season, for example, and the pozzolanic reactions still go forward with amazing speed to produce a highly satisfactory load-supporting material. This is not the case in connection with any other fly ash of which I am aware.

It is to be appreciated that additives such as accelerators, decelerators, water reducers and even portland cement, gypsum and the like may be included in compositions in accordance with this invention. These sometimes serve to give better density and to improve other properties of the final composition.

The process in accordance with this invention is highly advantageous commercially because it not only makes effective utilization of sulfur which is often considered an undesirable ingredient in coal but it also desulfurizes the stack gases of the furnace, thus eliminating a possible source of air pollution.

The proportions of ingredients in accordance with this invention are critical. The following relative proportions are used in carrying out the process:

| | |
|---|---|
| Highly active fly ash | 8 – 100 |
| Aggregate | 5 – 92 |
| Water | 5 – 30 |

The highly active fly ash according to this information has a combined sulfur content of about 5 to 50 percent expressed as sulfur trioxide, and a content of calcium oxide plus magnesium oxide (actually present as these compounds) from about 0.5 to about 30 percent by weight, wherein the ratio of uncombined calcium oxide plus magnesium oxide to combined calcium oxide plus magnesium oxide varies from about 0.2:1 to about 3:1.

The products in accordance with this invention have been subjected to many series of tests in order to determine and to prove their improved characteristics. The following compressive strength tests indicate that in the early stages of development a strength as high as five times the strength of a normal mix can be obtained in accordance with this invention.

EXAMPLE I

Apparatus:

1. Several Plexiglas tubes 1 inch ID × 10 inches long (open at both ends), capped at one end with a small piece of cloth held in place with a rubber band.

2. A penetration gauge which indicates the hydraulic pressure required to penetrate 1 inch into the material in question.

Procedure:

1. Plexiglas tubes were loosely filled with each of several samples of the two types of fly ashes — bituminous and highly active.

2. The tubes were placed — cloth capped end down — in a large container.

3. Into the container was placed several inches of water which immediately began soaking up into the tubes; in a few minutes going above into the water line by capillary action.

4. The specimens were given a penetration test 6 days after initial wetting.

Results:

| Specimen | Pressure (psi) required to penetrate one inch into the specimen |
|---|---|
| Bituminous 1 | 4.3 |
| 2 | 96.0 |
| 3 | 78.2 |
| 4 | 9.3 |
| 5 | 11.2 |
| Highly Active 1 | 2152.0 |
| 2 | 4843.3 |
| 3 | 7174.0 |
| 4 | 391.0 |

| | |
|---|---|
| 5 | 1164.9 |
| 6 | 1255.6 |
| 7 | 223.3 |

EXAMPLE II

Apparatus:
1. Several glass cylinders 2 inch ID × 5 ¾ inches long (open at both ends), capped at one end with a piece of nylon cloth held in place with a rubber band.
2. A penetration gauge designed to indicate the hydraulic pressure required to penetrate one inch into the specimen. The minimum discernable reading with this apparatus is 40 psi.

Procedure:
1. Glass tubes were loosely filled with each of the samples of the two types of fly ashes — bitunimous and highly active.
2. The tubes were placed — cloth capped end down — into an aquarium.
3. Deionized (equivalent to distilled) water was placed into the aquarium. The specimens became completely wetted by capillary action.
4. The specimens were given a penetration test 7 days after initial wetting.

Results:

| Specimen | | Pressure (psi) required to penetrate one inch into the specimen |
|---|---|---|
| Bituminous Fly Ash | A | <40 |
| | B | <40 |
| | C | <40 |
| Highly Active Fly Ash | A | 600 |
| | B | 3000 |
| | C | >8000 |
| | D | 1600 |

Under certain conditions this invention is operative without including any lime in the normal fly ash-lime-aggregate mixture. Frequently, it will be found that there is sufficient residual calcium oxide or magnesium oxide or a mixture of the two in this fly ash to perform the pozzolanic function of the lime in the final mixture.

The following tests have been conducted which show the sharply improved results that are obtained in accordance with this invention.

EXAMPLE III

Purpose:
To specifically clearly show the differences between compositions of aggregate, fly ash, and lime, using fly ashes of the bituminous and highly active categories, the following series of tests were run.

Materials:
1. Fly Ashes
Chemical analysis and sieve fineness of fly ash A (bituminous) in fly ash B (highly active) are shown in the following table.

TABLE 14-1

| Test | Fly Ash A Normal Fly Ash from Bituminous Coal | Fly Ash B Fly Ash from Bituminous Coal, resulting from Dolomite addition |
|---|---|---|
| Chemical Analysis | | |
| % $SiO_2$ | 39.6 | 24.7 |
| % $Al_2O_3$ | 23.9 | 14.0 |
| % $Fe_2O_3$ | 19.5 | 12.9 |
| % $CaO$ | 6.3 | 22.0 |
| % $MgO$ | 1.2 | 16.5 |
| % $SO_3$ | 1.5 | 6.0 |
| Sieve Fineness % Through No. 325 | | |

2. Hydrated Lime

In all tests described in this example a monohydrated dolomitic lime was used, the chemical formulation for this is calcium hydroxide plus magnesium oxide.

3. Aggregate
For aggregate, graded ottawa sand was used. This is a common denominator for all laboratory tests of nonplastic lime/fly ash/aggregate mistures.

Procedure:
1. The lime (if any), fly ash and sand were dry blended. The water requirement for these mixes is covered by ASTM method D 1557–66T, title being Moisture Density Relation of Soils Using 10 pound. Rammer and 18-Inch Drop. The purpose of this method is to develop the maximum compressability or maximum density of the finished compacted specimen. The mixing procedure used for forming the specimens is that designated as C 593 66T whose title is Fly Ash and Other Pozzolans For Use With Lime. This specification also covers the forming of the specimen. Specimens are formed in three layers, each layer receiving 25 uniformly distributed blows from the 10 pound hammer dropped from a distance of 18 inches, again as described in this ASTM specification.

Formed specimens are cylinders having a diameter of 4.0 inches and a height of 4.6 inches. Specimens are placed in sealed containers and cured in a 100° F oven for 14 days. After 14 days of curing the specimens are broken by compression, the test results given below are in lbs./sq. inch of the maximum load withstood by the specimen.

Test results:
The following table indicates the results of the above testing for bituminous and highly active fly ashes in conjunction with varying quantities of lime.

TABLE 14-2

| | % Monohydrated Dolomitic Lime | | | |
|---|---|---|---|---|
| TYPE OF FLY ASH | 0 | 0.5 | 2.0 | 3.0 |
| Fly Ash A Normal Fly Ash from Bituminous Coal | * | 571 | 1413 | 2020 |
| Fly Ash B Fly Ash from Bituminous Coal resulting from Dolomite addition | 1320 | 2019 | 2243 | 2780 |

* Specimens too weak for testing

COMPRESSIVE STRENGTH OF ROAD BASE MATERIALS

| Type of Fly Ash | Percent monohydrated dolomitic lime. psi | | |
|---|---|---|---|
| | 0 | 0.5 | 4 |
| Normal fly ash from bituminous coal | ~100 | 342 | 565 |
| Fly ash from bituminous coal, resulting from dolomite addition | 553 | 925 | 635 |

*Using procedure of preceding example.

It has also been discovered that some forms of high sulfur fly ash in accordance with this invention can themselves stabilize soil without the addition of any lime. Fly ash in accordance with this phase of the invention contains substantial quantities of calcium oxide, and has a composition within the ranges specified below.

TYPICAL ANALYSIS OF HIGH SULFUR ASH

| Wet Analysis | Fly Ash | Moist Cured Fly Ash |
|---|---|---|
| % ignition loss | 1.9 | 7.1 |
| % C | 1.5 | 1.4 |
| % $SiO_2$ | 24.2 | 22.7 |
| % $Fe_2O_3$ | 14.1 | 13.2 |
| % $Al_2O_3$ | 9.5 | 8.9 |
| % CaO | 11.5 | 10.8 |
| % MgO | 9.6 | 9.0 |
| % $SO_3$ | 28.9 | 27.2 |
| % $V_2O_5$ | 0.1 | 0.1 |

While this invention has been described with references to many specific embodiments, it is to be understood that these examples are intended to be illustrative and not to limit the scope of the invention, which scope is defined in the appended claims. It should be emphasized that it is not necessary to use the highly active sulfopozzolanically reactive fly ash alone, but that it can be combined with other materials without disadvantageous effects, provided those other materials do not interfere with the reactivity of the highly active ash. Examples of materials that can be added are portland cement, ordinary fly ash and lime, either as oxide or hydroxide or mixtures of the two. It will further be appreciated that the term "aggregate" as used herein is intended to be a generic term and includes soil and sand as well as other well-known aggregates such as rock, crushed stone, cinders and other well known aggregates. Further, while the fly ash according to this invention is preferably manufactured in dry form, and is so claimed herein, it will be appreciated that water may be added without departing from the scope of the claims. Indeed, water is a highly desirable additive since its presence greatly enhances the speed of the sulfopozzolanic reaction, either when fly ash is used alone or in combination with other ingredients as disclosed herein.

The following is claimed:

1. In a method of forming a hardenable load-bearing surface over an existing surface, the steps which comprise covering said existing surface with a composition consisting of, by weight, 5–87 percent aggregate, 5–30 percent water, and 8–90 percent finely divided sulfopozzolanically reactive fly ash containing about 5 to about 50 percent by weight of combined surface and allowing said composition to harden.

2. The method defined in claim 1, wherein the existing surface is soil, and wherein said soil is broken up and wherein the fly ash is mixed with the soil, said soil comprising at least part of said aggregate, and the mixture is compacted just after it has been applied over said existing surface.

* * * * *

UNITED STATES PATENT OFFICE
CERTIFICATE OF CORRECTION

Patent No. 3,753,620    Dated August 21, 1973

Inventor(s) Leonard John Minnick

It is certified that error appears in the above-identified patent and that said Letters Patent are hereby corrected as shown below:

Column 1, lines 66 and 67, delete "been unsuccessful unsuccessful" and insert therefore ---been largely unsuccessful---.

Column 2, line 27, delete "8 to 95" and insert ---8 to 90---.

Column 2, line 28, delete "5 to 92" and insert ---5 to 87---.

Column 3, lines 38 and 39, delete "accordnace" and insert therefore ---accordance---.

Column 5, line 31, delete "$3MO \cdot Al_{12}O_3 \cdot MSO_4 \cdot 12\text{-}13\ 12\text{-}H_2O$" and insert therefore ---$3MO \cdot Al_2O_3 \cdot MSO_4 \cdot 12\text{-}13\ H_2O$---.

Column 6, line 20, delete "8-100" and insert ---8-90---.

Column 6, line 21, delete "5-92" and insert ---5-87---.

Column 7, line 16, delete "bitunimous" and insert ---bituminous---.

Column 7, line 65, in the columns that are blank insert respectively ---89.3   83.6---.

Column 8, line 54, after the word "Materials" insert --- * ---.

Column 9, line 5, delete "Sulfur Ash" and insert therefore ---Sulfur Fly Ash---.

Column 10, line 20, delete "surface" and insert ---sulfate---.

Signed and sealed this 21st day of May 1974.

(SEAL)
Attest:

EDWARD M. FLETCHER, JR.
Attesting Officer

C. MARSHALL DANN
Commissioner of Patents